US009594154B2

(12) United States Patent
Henderer (10) Patent No.: US 9,594,154 B2
(45) Date of Patent: Mar. 14, 2017

(54) AUTOMATED CALIBRATION OF MULTISTATIC ARRAYS

(71) Applicant: Lawrence Livermore National Security, LLC, Livermore, CA (US)

(72) Inventor: Bruce Henderer, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 294 days.

(21) Appl. No.: 14/274,308

(22) Filed: May 9, 2014

(65) Prior Publication Data

US 2014/0333474 A1 Nov. 13, 2014

Related U.S. Application Data

(60) Provisional application No. 61/821,277, filed on May 9, 2013.

(51) Int. Cl.
| | |
|---|---|
| *G01S 7/40* | (2006.01) |
| *G01S 13/00* | (2006.01) |
| *G01S 13/87* | (2006.01) |

(52) U.S. Cl.
CPC .......... *G01S 7/4004* (2013.01); *G01S 13/003* (2013.01); *G01S 13/87* (2013.01); *G01S 2007/4086* (2013.01)

(58) Field of Classification Search
CPC .......... G01S 13/66; G01S 7/295; G01S 13/58; G01S 13/72
USPC .................................................. 342/174, 195
See application file for complete search history.

(56) References Cited

U.S. PATENT DOCUMENTS

| | | | | |
|---|---|---|---|---|
| 9,282,945 | B2 * | 3/2016 | Smith ...................... | A61B 8/00 |
| 2012/0098697 | A1 * | 4/2012 | Paek ...................... | G01S 13/003 |
| | | | | 342/174 |
| 2014/0333474 | A1 * | 11/2014 | Henderer .............. | G01S 7/4004 |
| | | | | 342/174 |

OTHER PUBLICATIONS

M. Morimoto, "New calibration method for large aerial arrays," in Electronics Letters, vol. 1, No. 7, pp. 192-193, Sep. 1965.*
T. Lei and C. N. Dorny, "Model-fitting approach to array calibration," Antennas and Propagation Society International Symposium, 1989. AP-S. Digest, San Jose, CA, USA, 1989, pp. 404-407 vol. 1.*

* cited by examiner

*Primary Examiner* — John B Sotomayor
(74) *Attorney, Agent, or Firm* — Harness, Dickey & Pierce, PLC (57) ABSTRACT

A method is disclosed for calibrating a multistatic array having a plurality of transmitter and receiver pairs spaced from one another along a predetermined path and relative to a plurality of bin locations, and further being spaced at a fixed distance from a stationary calibration implement. A clock reference pulse may be generated, and each of the transmitters and receivers of each said transmitter/receiver pair turned on at a monotonically increasing time delay interval relative to the clock reference pulse. Ones of the transmitters and receivers may be used such that a previously calibrated transmitter or receiver of a given one of the transmitter/receiver pairs is paired with a subsequently un-calibrated one of the transmitters or receivers of an immediately subsequently positioned transmitter/receiver pair, to calibrate the transmitter or receiver of the immediately subsequent transmitter/receiver pair.

20 Claims, 6 Drawing Sheets

AUTOMATED CALIBRATION OF MULTISTATIC ARRAYS

CROSS-REFERENCE TO RELATED APPLICATIONS

This application claims the benefit of U.S. Provisional Application No. 61/821,277, filed on May 9, 2013. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to multistatic arrays, and more particularly to a system and method for calibrating multistatic arrays without the need for human involvement in manually placing an external antenna in a measurement field and making manual measurements with electronic instruments to time-align the various pairs of arrays to remove time skewing.

BACKGROUND

The statements in this section merely provide background information related to the present disclosure and may not constitute prior art.

Multistatic arrays are a set of transmitters and receivers that can be used to measure a "location" of an object. Such arrays typically operate by emitting a wave from a transmitter and measuring the response received by all the receivers in the array. The response allows the location of the target as well as its physical shape to be characterized.

Multistatic arrays require that all the transmitters and receivers be timed in such a way that a target in the field of view of the array appears to be in the same "location" no matter what transmitter/receiver pair is used to measure the location of the target. At high speed data collection, varying cable lengths and capacitance result in time skewing from the ideal.

Previously, the needed time calibration was accomplished by a person manually moving an extra antenna in front of the array and observing the signal on an oscilloscope and manually adjusting the timing to put a well-known portion of the pulse at the proper time location on the oscilloscope. As one can imagine, this process of manually adjusting the timing introduces the possibility of human error into the calibration process. Requiring the use of a person to manually position an external antenna in front of the array also may introduce additional cost, time and complexity into the calibration process.

SUMMARY

In one aspect the present disclosure relates to a method for calibrating a multistatic array having a plurality of transmitter and receiver pairs spaced from one another along a predetermined path and relative to a plurality of bin locations, and further being spaced at a fixed distance from a stationary calibration implement. The method may comprise generating a clock reference pulse and turning on each of the transmitters and receivers of each said transmitter/receiver pair at a monotonically increasing time delay interval relative to the clock reference pulse. Ones of the transmitters and receivers may be used such that a previously calibrated transmitter or receiver of a given one of the transmitter/receiver pairs is paired with a subsequently un-calibrated one of the transmitters or receivers of an immediately subsequently positioned transmitter/receiver pair, to calibrate the transmitter or receiver of the immediately subsequent transmitter/receiver pair.

In another aspect the present disclosure relates to a method for calibrating a multistatic array having a plurality of transmitter and receiver pairs spaced from one another along a predetermined path and positioned relative to a plurality of bin locations, and further being spaced at a fixed distance from a stationary calibration implement. The method may comprise generating a clock reference pulse and turning on a transmitter of the first transmitter/receiver pair to generate a first transmitted signal. The receiver of the first transmitter/receiver pair may alternately be turned on and off at monotonically increasing time delay intervals to obtain a plurality of first data samples of a first reflected signal portion of the first transmitted signal. The first data samples may be used to determine in what specific one of the bins a peak of the first reflected signal portion fell. The receiver of the first transmitter/receiver pair may be calibrated by setting a turn on delay for the receiver of the first transmitter/receiver pair sufficient to skew a turn on time for the receiver of the first transmitter/receiver pair to cause the peak of the first reflected signal portion to fall within a first specific predetermined bin. A transmitter of a second transmitter/receiver pair may be used to generate a second transmitted signal. The receiver of the first transmitter/receiver pair may alternately be turned on and off at increasing time delay intervals to obtain a plurality of second data samples of a second reflected signal portion of the second transmitted signal. The second data samples may be used to determine in what specific one of the bins a peak of the second reflected signal portion fell. The transmitter of the second transmitter/receiver pair may be calibrated by setting a turn on delay for the transmitter of the second transmitter/receiver pair sufficient to skew a turn on time for the transmitter of the second transmitter/receiver pair to cause the peak of the second reflected signal portion to fall within a second predetermined bin.

In still another aspect the present disclosure relates to a system for calibrating a multistatic array having a plurality of transmitter and receiver pairs spaced from one another along a predetermined path and positioned relative to a plurality of bin locations, and further being spaced at a fixed distance from a stationary calibration implement. The system may comprise a controller and a timing subsystem for controllably turning on select ones of the transmitters and the receivers in response to signals from the controller. The controller may be being configured to perform several operations including generating a clock reference pulse and turning on each of the transmitters and receivers of each said transmitter/receiver pair at a monotonically increasing time delay interval relative to the clock reference pulse. The controller may also be configured to collect data samples obtained by the receivers using signals reflected from the calibration implement. In this manner a previously calibrated transmitter or receiver of a given one of the transmitter/receiver pairs is paired with a subsequently un-calibrated one of the transmitters or receivers of an immediately subsequently positioned transmitter/receiver pair, so that the transmitter or receiver of the immediately subsequent transmitter/receiver pair may be calibrated.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
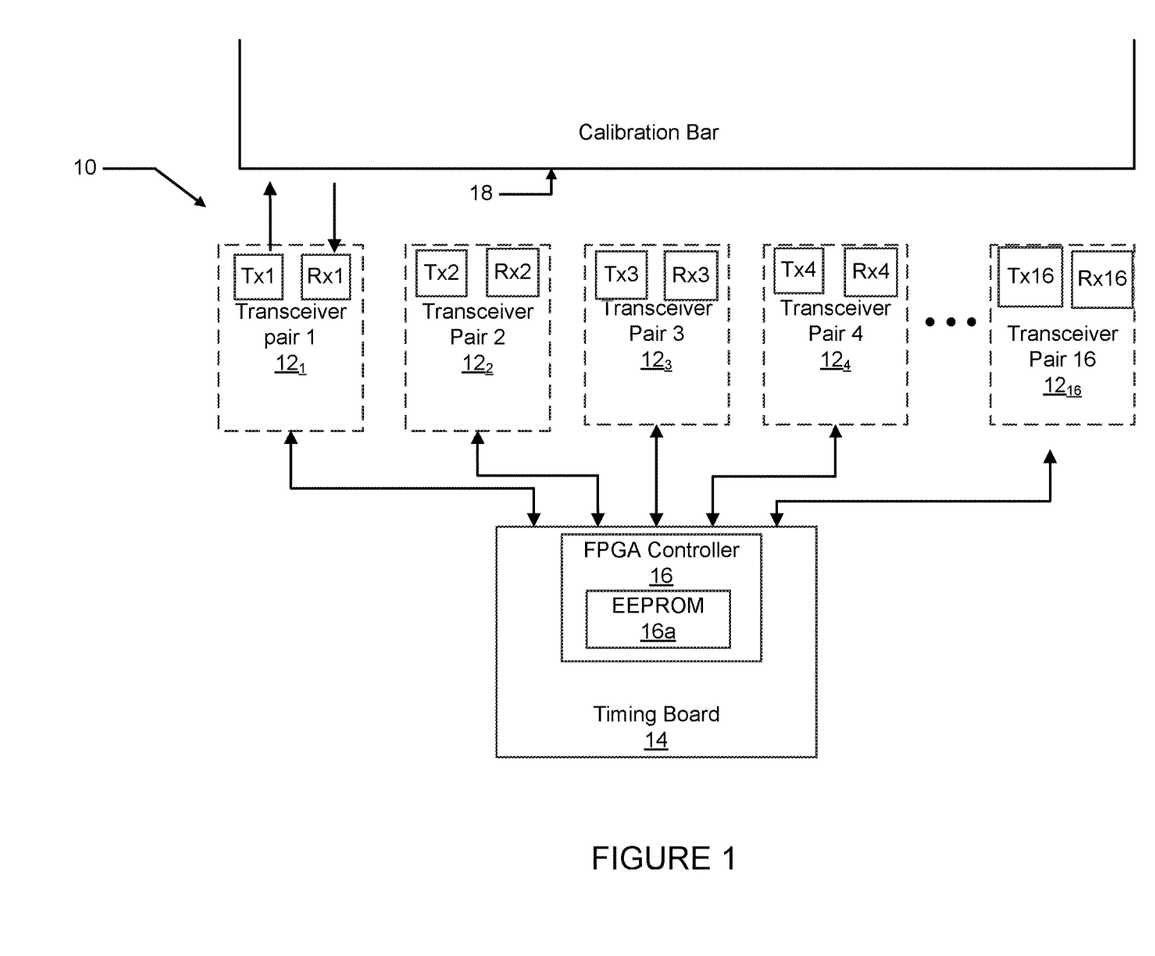
FIG. 1 is a highly simplified block diagram showing a plurality of transceiver pairs that may be used in carrying out a method of the present disclosure.

Referring to FIG. 1 there is shown one example of a multistatic array 10 (hereinafter "array" 10) that may be calibrated using the teachings of the present disclosure. The array 10 may comprise a plurality of transceiver pairs $12_1$-$12_{16}$, in this example 16 such transceiver pairs, although it will be appreciated that a greater or lesser number of transmitters and receivers may be used to meet the needs of a specific application. A Field Programmable Gate Array ("FPGA") controller 16 may be used to control a timing board 14, which turns on and off each of the transmitters and receivers of each of the transceiver pairs $12_1$-$12_{16}$. The FPGA controller 16 may have an electrically erasable programmable read only memory (EEPROM) 16a or any other suitable memory for storing collected data values pursuant to carrying out a calibration methodology in accordance with the present disclosure. A conventional calibration bar 18 may be used as the stationary target or object which is being detected during the calibration process of the present disclosure.

It will be understood that multistatic array "timing" is the setting of delay triggers on the timing board 14 using the FPGA 16 digital-to-analog converter ("DAC") outputs in such a way that individual transmitters "fire", in turn, at the same delay time after a clock reference pulse and the receivers "latch" (i.e., turn on) at the same delay time (different than the transmitters) after the clock reference pulse. The goal is to be able to align the transmit and receive times without the use of an outside reference or the need for an oscilloscope. However, because of variables such as capacitance, cable lengths and so forth, previous calibration techniques have required the use of a separate antenna and an oscilloscope which an individual uses to time align the transceiver pairs. This has previously been required so that the time delay associated with the turn on of each transmitter and receiver can be precisely taken into account.

Figure 2:
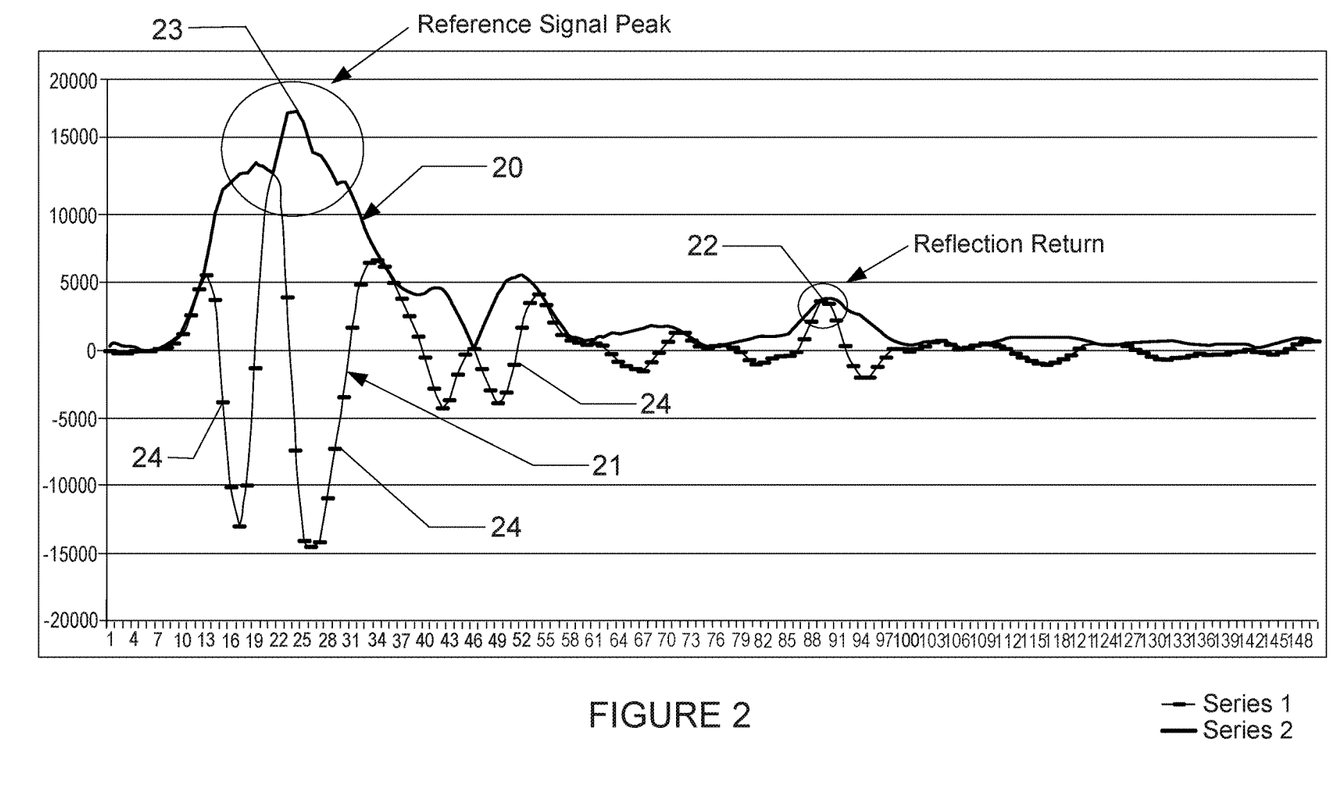
FIG. 2 is a waveform illustrating the first 150 of 512 bins in which signal measurements are obtained to determine in which bin the peak of a reflected pulse is being received.
Figure 3:
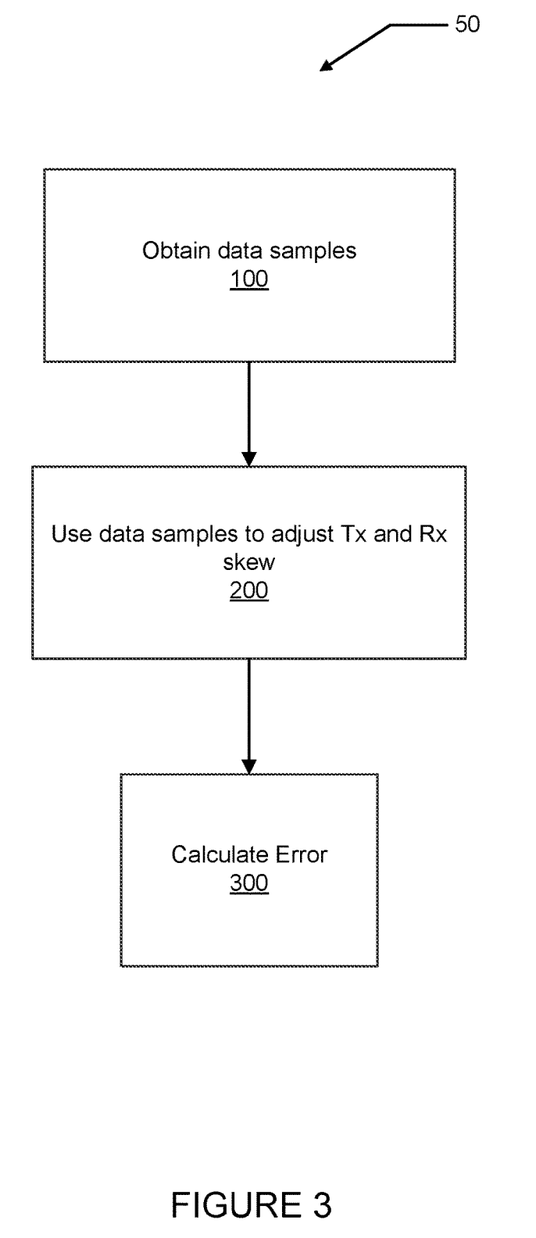
FIG. 3 is a flowchart illustrating major operations in use in calibrating the multistatic array of FIG. 1.
Figure 4:
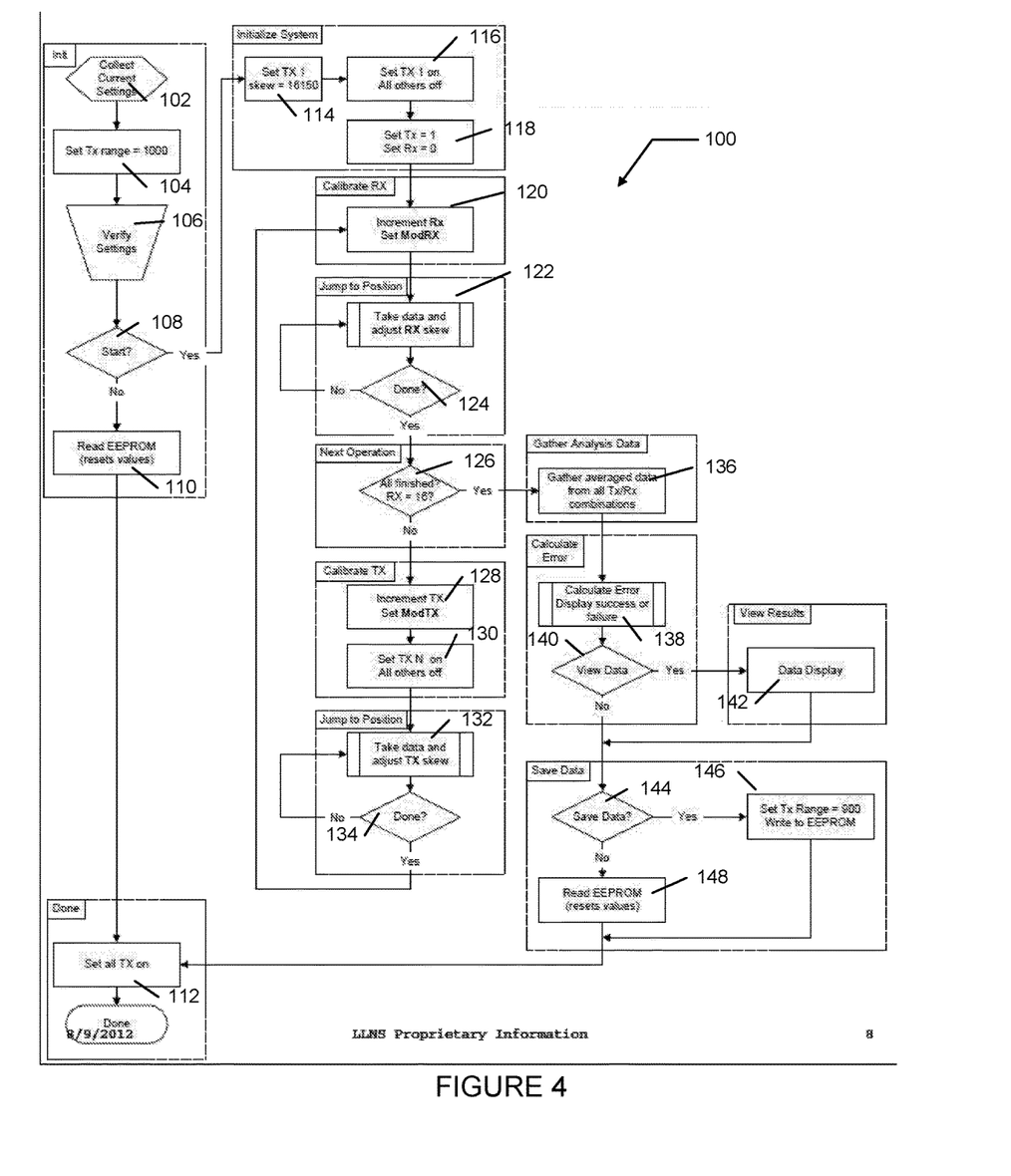
FIG. 4 is a flowchart setting forth detailed operations that may be performed during the data acquisition phase of the calibration methodology set forth in FIG. 3.

It will be appreciated that it is critical that when properly calibrated, each of the receivers of the transceiver pairs $12_1$-$12_{16}$ will be turned on at a precise time, and the precisely determined turn on time must take into account the time delay that may be introduced by the variables described above, as well as the distance between the first transmitter (or transceiver pair $12_1$) and each of the other transmitters and receivers. Briefly, each transmitter and receiver must turn on such that the peak of the transmitted pulse falls within a specific predetermined bin, where each bin defines a time slot of predetermined duration taking into account the time delay introduced by variables such as varying capacitance and cable lengths. In this example, the predetermined duration is about 40 picoseconds. FIG. 2 illustrates a portion of a transmitted pulse 21 and the first 150 of 512 bins to illustrate how the reflected peak 22 of the pulse 21 is detected. In this instance the peak 22 of the pulse 21 reflected back to the specific receiver being used is received by the specific receiver in bin 90. Short horizontal lines 24 represent specific readings taken by the specific receiver at each of the first 150 bins. As an example, it may be that mathematical calculations have determined that the reflected peak 22 should fall within bin 85, taking into account the time delay introduced by cabling, capacitance, spacing of the specific receiver, distance to the calibration bar, etc. Accordingly, in this example the turn on time of the receiver would need to be adjusted so that the peak of the reflected signal received by the receiver falls in bin 85 (i.e., the reflected peak is received by the receiver in bin 85). Referring to FIG. 3, a high level flowchart is shown of one example of a calibration methodology 50 in accordance with the present disclosure. The calibration methodology 50 may be viewed as executing a plurality of major operations 100, 200 and 300, which will each be described in greater detail in the following paragraphs and with reference to FIGS. 4-6. But at a high level, operation 100 initially involves obtaining a desired number of data samples from a transmitter and receiver being calibrated $12_1$-$12_{16}$. The data samples may then be used to adjust the transmit (Tx) or receive (Rx) skew $12_2$-$12_{16}$, as indicated at operation 200. This pair of operations, 100 and 200, are repeated sequentially down the array until all components have been calibrated. At operation 300 the error between where the calculated peak locations and the obtained data samples for all combinations of transmitters and receivers $12_1$-$12_{16}$ is determined and the root means square error (RMSE) is calculated for each transmitter and receiver $12_1$-$12_{16}$. Referring to FIG. 4, a more detailed flowchart of the various operations that may be performed during the data collection operation 100 described in FIG. 3. The RF design of the array 10 is configured so that the cross coupling waveform is normally not visible during operation. By "not visible" it is meant that the cross coupling waveform is shifted outside the viewing window (as represented by the bins) of the receivers $12_1$-$12_{16}$. The calibration routine 100 begins by querying the FPGA EEPROM 16a to collect the current unit settings at operation 102 to allow the system to reset to current state in the case of a failed or aborted calibration. At operation 104 the transmit (Tx) range is set to 1000 for this system to allow an operationally unused, but useful to calibration, part of the transmitted waveform to be viewed. This may be understood to be the viewing "window" of the entire array of transceivers $12_1$-$12_{16}$ and defines the outer boundaries of the viewing window. At operation 106 the obtained settings from the FPGA 16 and the desired target bins for the calibration are verified by the operator.

The calibration routine 100 then waits to see if it is to be continued, as indicated at operation 108. If the user selects not to continue, then the EEPROM values (i.e., reset values) may be read, as indicated at operation 110. This results in resetting all timing parameters to whatever is in the FPGA's EEPROM 16a). The transmitters are all turned on, as indicated at operation 112, to ensure that the system 10 is operating.

If at operation 108 the user selects to continue with the calibration routine 100, then the skew for $Tx_1$ is set to a designated initial value, in this example 16150 at operation 114. At operation 116 $Tx_1$ of transceiver pair $12_1$ is turned on and all other transmitters are turned off. At operation 118 a software component is used to set Tx=1 and Rx=0, meaning that $Rx_1$ is turned off. At operation 120 the receiver is incremented to "1", meaning that the $Rx_1$ receiver is turned on. At operation 122 data is obtained for a predetermined number of samples (i.e., pulses). More particularly, $Tx_1$ is pulsed a predetermined number of times, in this example 512 times, and for each pulse emitted by $Tx_1$, $Rx_1$ of transceiver pair $12_1$ is turned on at predefined and monotonically increasing delay intervals and measurements are taken of the signal received by $Rx_1$. These measurements are used to construct a reflected waveform 21 as seen in FIG. 2. The peak of the reflected waveform as seen by $Rx_1$ is denoted by reference numeral 22. In this example one hundred of these reflected waveforms 21 are collected and averaged to use for processing. The data obtained is then used to adjust the timing skew of the receiver $RX_1$ to align the peak 22 of the reflected pulse 21 at the correct (i.e., desired) bin location. At operation 124 a check is made to see if the skew needed to be changed. If the skew did not need to be changed, then the receiver $Rx_1$ is consider calibrated and the process continues to operation 126. If the receiver $Rx_1$ needed the skew adjusted, then operation 122 is repeated.

When the check at operation 124 indicates that the receiver being checked is calibrated, a check is made at operation 126 to see if this is the last receiver needing calibration ($Rx_{16}$). If not, then the next transmitter is calibrated beginning at operation 128.

At operation 128 the transmitter is incremented, meaning that $Tx_2$ is selected for use. At operation 130 $Tx_2$ is turned on and a check is made to ensure that all the other transmitters are turned off. At operation 132, 512 pulses are generated by $Tx_2$ and received by $Rx_1$, the previously calibrated receiver, at predefined and monotonically increasing delay interval, which generates 512 data samples, just as was done with $Rx_1$ using the pulses from $Tx_1$ in operation 122. This produces the waveform 21 as seen in FIG. 2. One hundred of these waveforms are collected and averaged to use for processing. The data obtained is then used to adjust the timing skew of the $Tx_2$ to align the reflected pulse 22 at the correct bin location. At operation 134 a check is made to see if the skew needed to be changed. If the skew did not need to be changed, then the transmitter is consider calibrated and the process returns to operation 120. If the transmitter needed the skew adjusted, then operation 132 is repeated. It will be appreciated then that $Rx_1$ is being used as the receiver to obtain the data sample associated with each pulse from $Tx_2$. Thus, it will be appreciated that $Rx_1$ is being used to help calibrate the delay time for $Tx_2$.

When the test at operation 134 indicates that transmitter $Tx_2$ has been calibrated, then operations 120-124 are repeated using the $Rx_2/Tx_2$ pair. Operation 120 increments the Rx flag to 2, indicating that $Rx_2$ is now being calibrated using $Tx_2$. Operations 120-134 are thus repeated until all 16 transmitters and receivers have been calibrated. When the check at operation 126 indicates that these conditions have been satisfied (i.e., that the last receiver has been calibrated, in this example $Rx_{16}$) then the process loop ends and the process continues at operation 136.

Operation 136 collects and averages 100 waveforms for each Tx and Rx pair in the system (256 waveforms in our example of 16 transmitters and 16 receivers) in the same manner as in operations 122 and 132. This data is passed to operation 138 to calculate the error. The error calculation in this example is a Root Mean Square Error (RMSE) between the expected location of the return pulse based on mechanical separation and the measured value's return pulse gathered in Operation 136. There are 32 RMSE calculations, one for each transmitter to all the receivers and one for each receiver to all the transmitters. All 32 RMSE measurements must be below a desired factor (i.e., a predetermined RMSE value) for the system to be considered calibrated. In this example, the predetermined RMSE value is 2.1.

At operation 140 a check is made to determine if the user wants to view the data or not. If so, the data is displayed at operation 142 on a suitable display. If the check at operation 140 determines that the user does not wish to view the data, then a check is made at operation 144 to determine if the data is to be saved. If so, then the Tx range is set to 900 (the appropriate value for this system to return it to the operational range) and the timing skew data is written to the FPGA's EEPROM 16a, as indicated at operation 146. If not, then the EEPROM 16a is reset at operation 148. Operation 112 (described above) executes to ensure that all transmitters are operating and the system is ready for operation.

Figure 5:
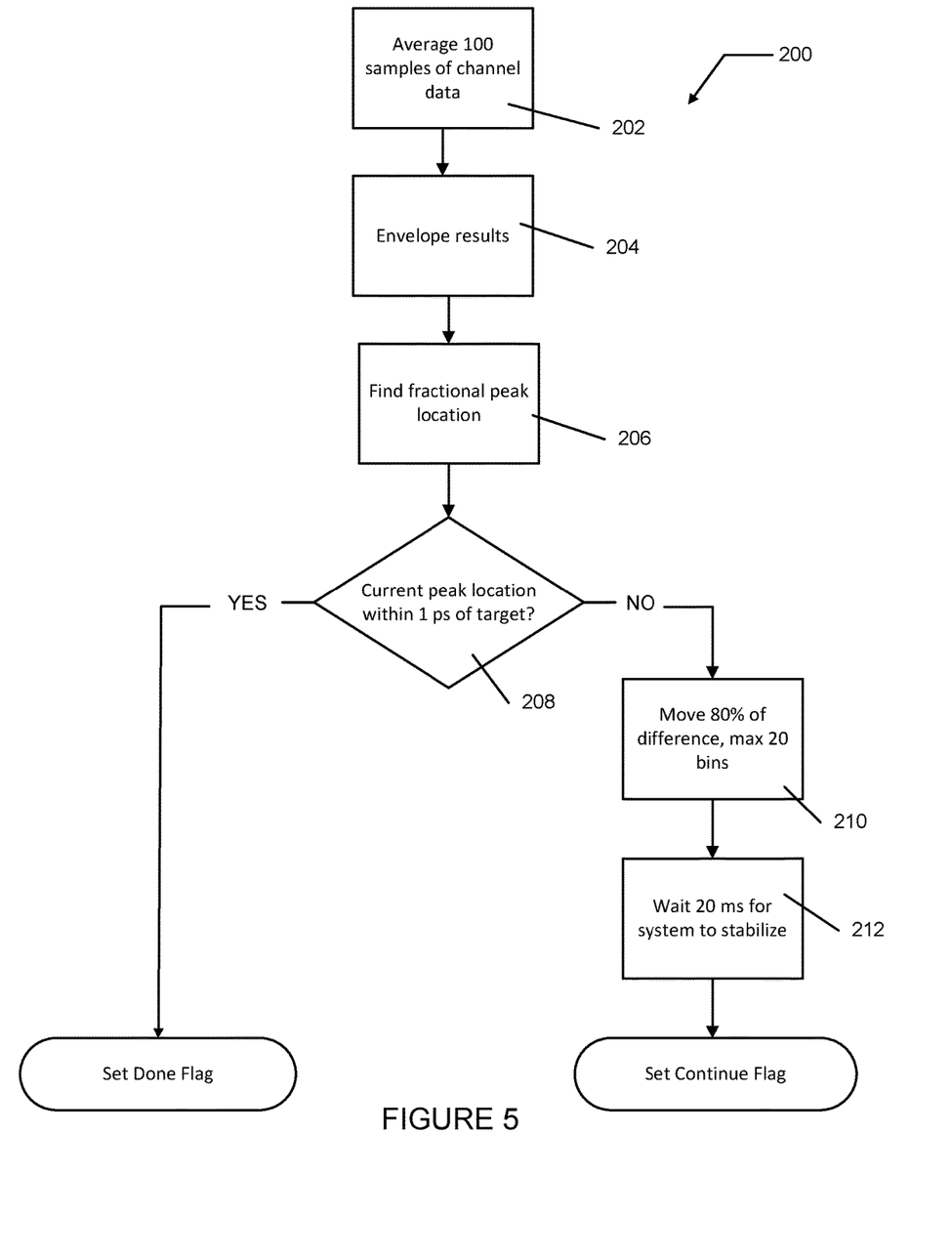
FIG. 5 is a flowchart setting forth detailed operations that may be performed during the skew adjustment phase of the methodology mentioned in connection with FIG. 3.

FIG. 5 illustrates in greater detail various operations that may be performed as part of operation 200 of FIG. 3 relating to adjusting the skew of the transmitters and receivers of the transceiver pairs $12_1$-$12_{16}$. More particularly, FIG. 5 shows in greater detail various operations that may be performed in finding the peak location of the waveform as seen by one specific transmitter and receiver. The averaging of 100 samples for each of the 512 data bins at operation 202 results in a waveform with limited noise effects. Operation 204 is a mathematical process of creating an envelope 20 in (FIG. 2) of the waveform. This is important for consistently finding the reference signal peak 23 (FIG. 2) and the reflection return peak 22 (FIG. 2) as they are consistently separated by the same number of bins. At operation 206 the fractional peak location is obtained for the reflection return signal 21. A mathematical algorithm that fits a quadratic polynomial to sequential groups of data points is used to determine the location of the peak (in one example peak 22 in FIG. 2), even if it would occur between the data points. At operation 208 a check is made if the current peak location is within 1 ps of the target location (i.e., the mathematically determined bin that the peak should fall within). If the current peak is not within 1 ps of the target bin, then the time window is skewed 80% of the difference, or a maximum of 20 bins, as indicated at operation 210. This value is converted into a timing delay change and added/subtracted from the current delay of the channel under calibration. This delay can include fractional bin sizes since the timing board 14 has greater resolution than the receiver bin size. To provide for extreme accuracy, the return peak is placed on the boundary of the 99 and 100 bin. The receiver delay offset is adjusted until the reflected waveform peak is on the boundary. A time delay of 20 ms may then be implemented to allow the system to stabilize and stale data to be flushed before further operations may be performed, as indicated at operation 212.

Figure 6:
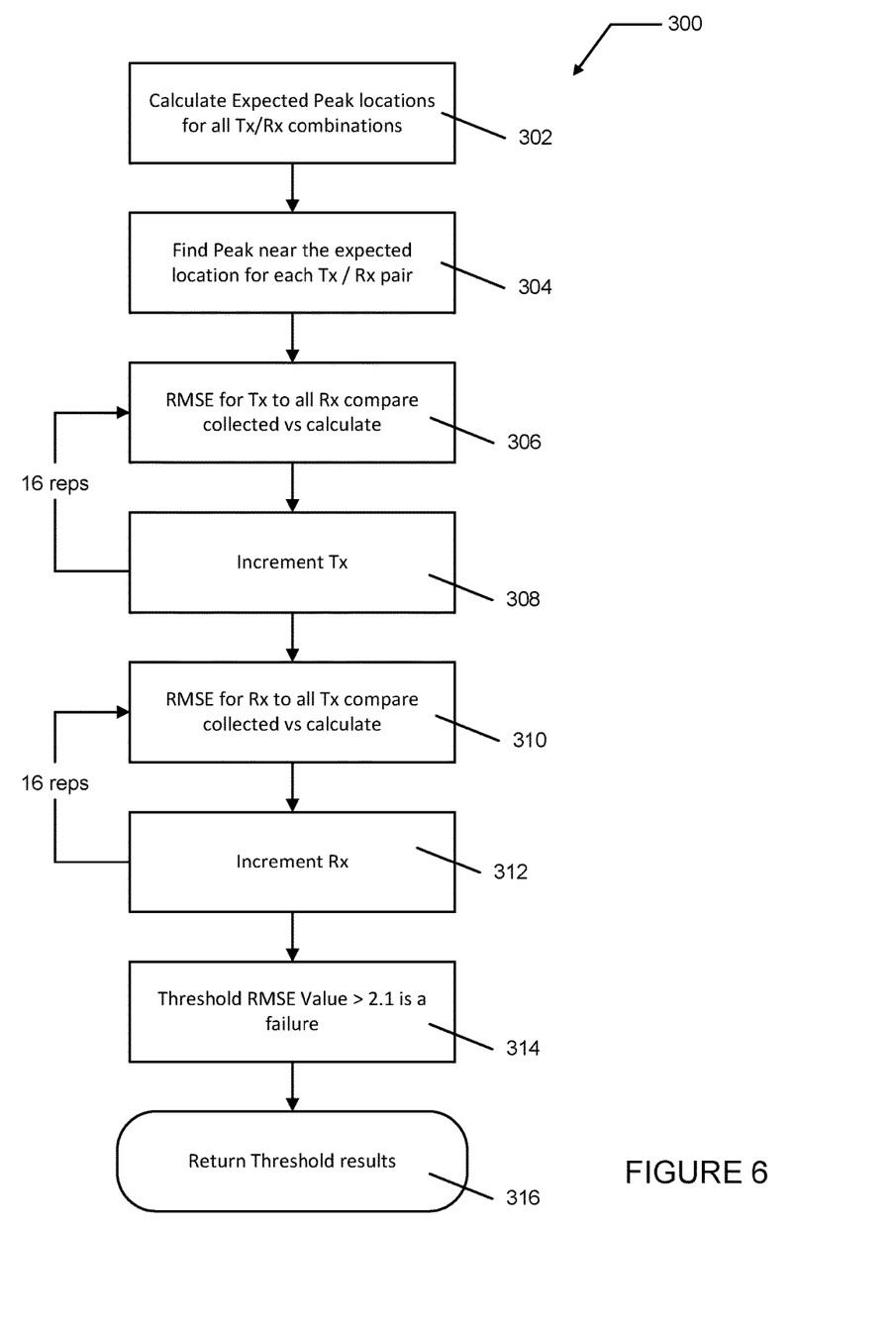
FIG. 6 is a flowchart setting forth detailed operations that may be performed during the error calculation phase of the methodology mentioned in connection with FIG. 3.

At FIG. 6 a flowchart is shown that presents in greater detail various operations that may be performed in carrying out the error calculation methodology 300 mentioned in FIG. 3. At operation 302 the expected peak locations for all Tx/Rx combinations are determined using the same methodology as shown in FIG. 5, operations 202, 204 and 206. At operation 304 the methodology finds the peak near the expected location for each Tx/Rx pair. These locations are compared with the theoretical locations created by the geometry of the system. At operation 306, the root means square error (RMSE) for a Tx to all 16 Rx is determined, which involves a comparison of the collected versus theoretical reflection return for each Tx/Rx pair. At operation 308 the transmitter is incremented and operation 306 is re-performed until all 16 transmitters have had a comparison run against all 16 receivers receiver. At operations 310 and 312 the same comparison is performed for each receiver to all 16 transmitters $12_1$-$12_{16}$. The Root Mean Square Error is created for each transmitter and receiver, 32 RMSE values in total. If the Mean Square Error of any element is greater than 2.1, then the system fails the calibration, as indicated at operation 314.

The present system and method thus enables calibration of a multistatic array without the need for an individual to manually place an external antenna in front of each array. By calibrating each transmitter and receiver relative to the transmitter or receiver immediately adjacent to it that was just calibrated, the present system and method can properly determine the appropriate turn on time for the receiver and transmitter of each transceiver pair.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for calibrating a multistatic array having a plurality of transmitter and receiver pairs spaced from one another along a predetermined path and relative to a plurality of bin locations, and further being spaced at a fixed distance from a stationary calibration implement, the method comprising:
   generating a clock reference pulse;
   turning on each of the transmitters and receivers of each said transmitter/receiver pair at a monotonically increasing time delay interval relative to the clock reference pulse; and
   using ones of the transmitters and receivers such that a previously calibrated transmitter or receiver of a given one of the transmitter/receiver pairs is paired with a subsequently un-calibrated one of the transmitters or receivers of an immediately subsequently positioned transmitter/receiver pair, to calibrate the transmitter or receiver of the immediately subsequent transmitter/receiver pair.

2. The method of claim 1, wherein a time delay turn on value is determined that causes each said receiver and each said transmitter of every said transmitter/receiver pair to be turned on at a specific bin location.

3. The method of claim 1, wherein the method comprises, for each one of the receivers of every transmitter/receiver pair, determining at what bin location a peak of a reflected signal being received by a specific one of the receivers falls within.

4. The method of claim 3, wherein the method further comprises obtaining a plurality of groups of data samples for each said receiver and determining, for each said receiver, an average bin location where the peak of the reflected signal occurs.

5. The method of claim 4, further comprising determining a fractional bin location for at least one of the average bin locations.

6. The method of claim 5, further comprising determining an error representing a difference between where a specific one of the fractional bin locations occurs for a given one of the receivers, relative to where the fractional bin location for the given one of the receivers is mathematically determined to occur.

7. The method of claim 6, further comprising setting a time delay turn on value for the given one of the receivers based on the error.

8. A method for calibrating a multistatic array having a plurality of transmitter and receiver pairs spaced from one another along a predetermined path and positioned relative to a plurality of bin locations, and further being spaced at a fixed distance from a stationary calibration implement, the method comprising:
   generating a clock reference pulse;
   turning on a transmitter of the first transmitter/receiver pair to generate a first transmitted signal;
   alternately turning on and off the receiver of the first transmitter/receiver pair at monotonically increasing time delay intervals to obtain a plurality of first data samples of a first reflected signal portion of the first transmitted signal;
   using the first data samples to determine in what specific one of the bins a peak of the first reflected signal portion fell;
   calibrating the receiver of the first transmitter/receiver pair by setting a turn on delay for the receiver of the first transmitter/receiver pair sufficient to skew a turn on time for the receiver of the first transmitter/receiver pair to cause the peak of the first reflected signal portion to fall within a first specific predetermined bin;
   using a transmitter of a second transmitter/receiver pair to generate a second transmitted signal;
   alternately turning on and off the receiver of the first transmitter/receiver pair at increasing time delay intervals to obtain a plurality of second data samples of a second reflected signal portion of the second transmitted signal;
   using the second data samples to determine in what specific one of the bins a peak of the second reflected signal portion fell; and
   calibrating the transmitter of the second transmitter/receiver pair by setting a turn on delay for the transmitter of the second transmitter/receiver pair sufficient to skew a turn on time for the transmitter of the second transmitter/receiver pair to cause the peak of the second reflected signal portion to fall within a second predetermined bin.

9. The method of claim 8, further comprising subsequently calibrating each said transmitter and each said receiver of every subsequent said pair of receivers and transmitters of the multistatic array by using an immediately preceding one of the transmitters or receivers that was just calibrated to help in obtaining subsequent groups of data samples so that a turn on delay for each subsequent one of the receivers and the transmitters may be calibrated.

10. The method of claim 8, further comprising:
re-transmitting the first transmitted signal a plurality of times;
using the receiver of the first transmitter/receiver pair to obtain a plurality of groups of first data samples from a corresponding plurality of first reflected signal portions of the first transmitted signal; and
using an averaging process to determine, from the plurality of groups of first data samples, an average bin location where the peak of the first reflected signal falls in.

11. The method of claim 10, further comprising:
enveloping the results of the averaging process;
determining a fractional bin location for the average bin location that the peak of the first reflected signal portion falls in; and
determining if the fractional bin location that the peak of the first reflected signal portion falls in is within 1 picosecond of a target bin, where the target bin represents a mathematically determined bin location wherein the peak of the first reflected signal portion needs to fall within for calibration to occur.

12. The method of claim 11, further comprising:
determining when the fractional bin location is determined to not be within 1 picosecond of the target bin, then moving the fractional bin location one of:
20 percent from the determined fractional bin location; or
no more than 20 bins if the determined fraction bin location is greater than 20 percent from the determined fractional bin location.

13. The method of claim 9, further comprising:
causing the transmitter of the second transmitter/receiver pair to retransmit the second transmitted signal a plurality of times;
using the receiver of the first transmitter/receiver pair to obtain a plurality of groups of second data samples from a corresponding plurality of second reflected signal portions of the second transmitted signal; and
using an averaging process to determine, from the plurality of groups of second data samples, in what bin the peak of the second reflected signal portion falls.

14. The method of claim 13, further comprising:
enveloping the results of the averaging process;
determining a fractional bin location for the average bin location that the peak of the second reflected signal portion falls in; and
determining if the fractional bin location that the peak of the second reflected signal portion falls in is within 1 picosecond of a target bin, where the target bin represents a mathematically determined bin location wherein the peak of the second reflected signal portion needs to fall within for calibration to occur.

15. The method of claim 14, further comprising:
determining when the fractional bin location is determined to not be within 1 picosecond of the target bin, then moving the fractional bin location one of:
20 percent from the determined fractional bin location; or
no more than 20 bins if the determined fraction bin location is greater than 20 percent from the determined fractional bin location.

16. The method of claim 15, further comprising:
making a root mean square error (RMSE) determination to obtain an RMSE value for each one of the transmitters and for each one of the receivers of every transmitter/receiver pair;
comparing each of the obtained RMSE values to a predetermined RMSE value; and
determining if each said transmitter and each said receiver has been calibrated acceptably if all the RMSE values fall below the predetermined RMSE value.

17. A system for calibrating a multistatic array having a plurality of transmitter and receiver pairs spaced from one another along a predetermined path and positioned relative to a plurality of bin locations, and further being spaced at a fixed distance from a stationary calibration implement, the system comprising:
a controller;
a timing subsystem for controllably turning on select ones of the transmitters and the receivers in response to signals from the controller;
the controller being configured to:
generate a clock reference pulse;
turn on each of the transmitters and receivers of each said transmitter/receiver pair at a monotonically increasing time delay interval relative to the clock reference pulse; and
collect data samples obtained by the receivers using signals reflected from the calibration implement such that a previously calibrated transmitter or receiver of a given one of the transmitter/receiver pairs is paired with a subsequently un-calibrated one of the transmitters or receivers of an immediately subsequently positioned transmitter/receiver pair, to calibrate the transmitter or receiver of the immediately subsequent transmitter/receiver pair.

18. The system of claim 17, wherein the controller further is configured to determine time delay values that cause each said receiver and each said transmitter of every said transmitter/receiver pair to be turned on at a specific bin location.

19. The system of claim 18, wherein the controller is further configured to:
determine, for each one of the receivers of every transmitter/receiver pair, at what bin location a peak of a reflected signal being received by a specific one of the receivers falls within; and
to obtain a plurality of groups of data samples for each said receiver and to determine, for each said receiver, an average bin location where the peak of the reflected signal being received by each said receiver occurs.

20. The system of claim 19, wherein the controller is further configured to determine an error for each said average bin location relative to a mathematically calculated bin location, and to generate a new bin location for any one of the receivers that generates an average bin location that exceeds a predetermined error value.

* * * * *